United States Patent Office 3,282,966
Patented Nov. 1, 1966

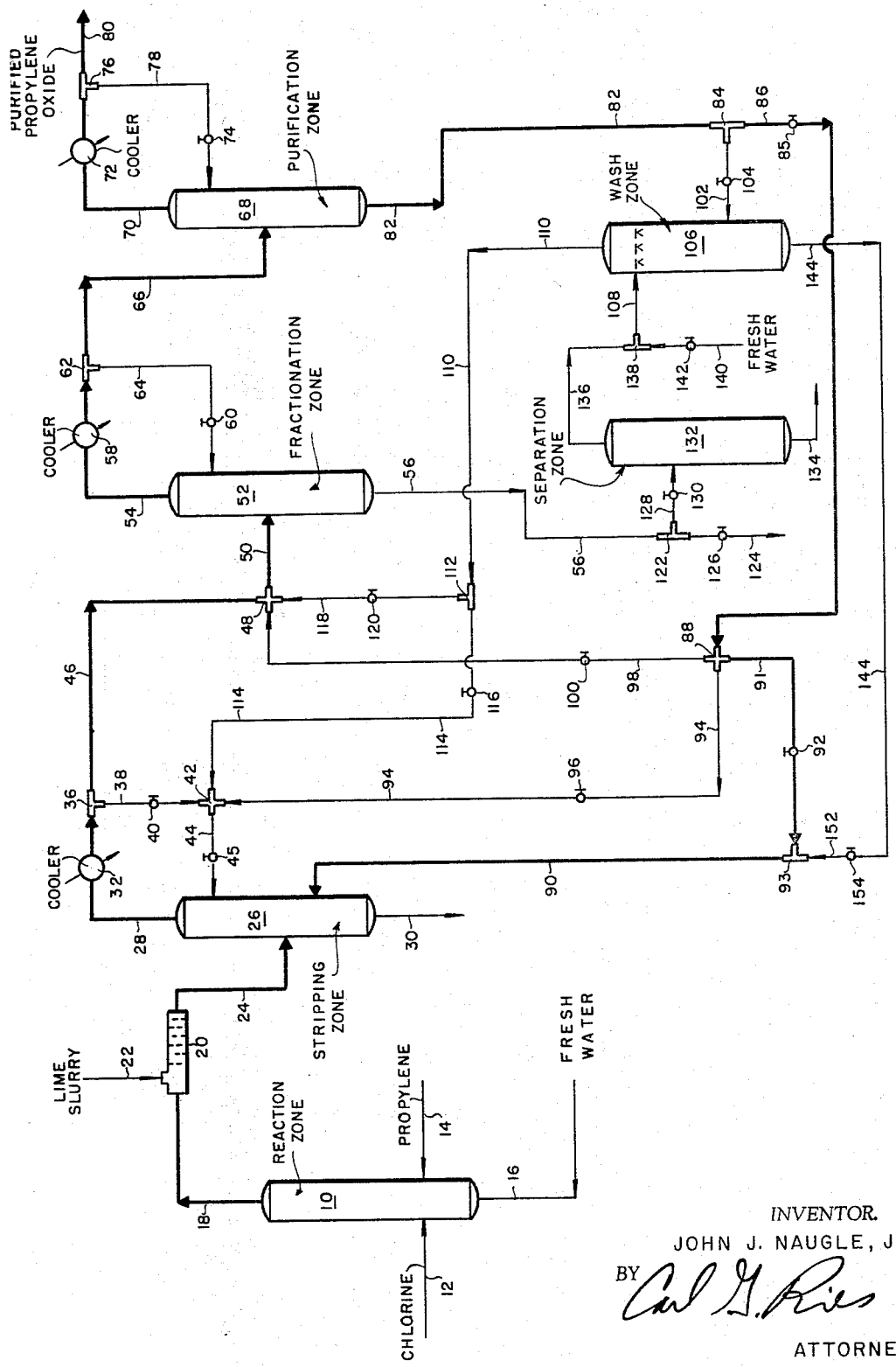

3,282,966
RECOVERY OF PURIFIED PROPYLENE OXIDE BY PLURAL STAGE DISTILLATION
John J. Naugle, Jr., Groves, Tex., assignor to Jefferson Chemical Company, Houston, Tex., a corporation of Delaware
Filed Mar. 1, 1965, Ser. No. 440,667
5 Claims. (Cl. 260—348.6)

This application is a continuation-in-part of copending application Serial No. 204,898, filed June 25, 1962, and entitled, "Purification of Propylene Oxide."

This invention relates to a method for the purification of propylene oxide. More particularly, this invention relates to an improved method for the recovery of propylene oxide derived from propylene chlorohydrin in a manner to obtain a maximized yield of extremely high-purity propylene oxide.

It is known to prepare propylene oxide by reacting propylene with chlorine in aqueous solution to form propylene chlorohydrin and by reacting the propylene chlorohydrin in aqueous solution with a base such as calcium hydroxide to provide a reaction product containing propylene oxide. The propylene oxide is normally recovered from the crude reaction mixture by distillation. For many industrial applications, propylene oxide purity is not highly critical (e.g., when propylene oxide is to be converted to propylene glycol). However, when the propylene oxide is to be utilized to prepare more complex chemical products such as poly(oxypropylene) ethers which, in turn, are utilized in the preparation of detergents or high molecular weight resins such as polyurethanes, much more stringent purification requirements are necessary, and it is important that impurities constitute less than about 50 parts per million and that the product be substantially anhydrous.

Propylene oxide of this high degree of purity can be prepared by fractionation to obtain a high-purity distillate fraction and a bottoms propylene oxide fraction of lower purity (to be use, for example, in making propylene glycol). Such methods, however, are not entirely satisfactory, either because of the high investment required or because of the lower yield of high-purity product.

Thus, if all of the propylene oxide produced in a manufacturing facility is to be of high purity, it is necessary, in accordance with conventional techniques, to employ either superfractionation or redistillation, which significantly adds to the cost of the process both from the point of view of initial investment and operating costs. On the other hand, and in the absence of expensive distillation capacity, only a portion of the propylene oxide that is produced in the facility can be recovered as high-purity propylene oxide, a significant portion of the product necessarily being of a low purity which is unacceptable for many commercial uses such as the preparation of poly(oxypropylene) ethers for use in the production of polyurethane foams.

In contrast to the foregoing, however, it has now been discovered that with only minimum distillation equipment it is possible to obtain all of the propylene oxide from a commercial facility as high-purity propylene oxide when a concentrated propylene oxide distillate fraction is separated into a high-purity propylene oxide distillate fraction and a lower-purity bottoms fraction, when the bottoms fraction is countercurrently contacted with water at a temperature within the range of about 100° to about 200° F. and then recycled.

The invention will be further illustrated in connection with the attached drawing wherein the single figure is a schematic flow sheet illustrating a preferred method for practicing the process of the present invention.

In order to simplify the description of the invention, conventional equipment necessary for the operation of a distillation column such as condensers, reboilers, heat exchanges, etc., have been omitted. Thus, it will be understood that conventional distillation equipment will be utilized.

Turning now to the drawing, there is schematically shown a reaction zone 10 to which chlorine is charged by way of a line 12, together with propylene charged by line 14 and water charged by line 16.

Within the reaction zone 10, the propylene reacts with the chlorine to form propylene chlorohydrin which is discharged from the reaction zone 10 in aqueous solution by way of a line 18. The propylene chlorohydrin in the line 18 is charged to a dehydrochlorination zone wherein it is treated with a base such as calcium hydroxide in order to neutralize hydrogen chloride and form propylene oxide. Since the dehydrochlorination reaction is rapid, this may be conveniently accomplished, for example, by charging the product 18 to a mixing zone 20 such as a baffle plate incorporator wherein the material is mixed with an aqueous slurry of lime charged by a line 22.

The resultant mixture is discharged from zone 20 by way of a line 24 leading to a stripping zone 26 which may suitably be a single distillation column.

Within the stripping zone 26, a flashing operation is accomplished in order to remove the propylene oxide from as much of the water as possible and as soon as possible in order to minimize hydration of the propylene oxide to propylene glycol. The flashing operation is normally conducted at a temperature of 150° to 225° F. When this is done, an overhead distillate fraction 28 is taken which will comprise, for example, from about 40% to about 90% propylene oxide, the balance being water, propylene dichloride and impurities. The composition of the stream 28 is to be contrasted with the composition of the stream 24 which will comprise, for example, from about 90 to about 95 wt. percent of water and from about 3 to about 5 wt. percent of propylene oxide, the balance being calcium hyrdoxide, calcium chloride, propylene chlorohydrin, propylene dichloride, diisopropyl ether, propylene glycol, propionaldehyde, etc.

The distillate fraction 28 is thereafter subjected to distillation, as for example, in a manner to be described, at distillation temperatures within the range of about 90° to about 220° F. in order to recover high-purity propylene oxide.

Returning to column 26, a bottoms fraction 30 is obtained which will comprise the calcium compounds, a significant quantity of water, propylene dichloride and other impurities.

The overhead distillate fraction 28 is liquified (e.g., in a cooler 32) and then charged to a manifold 36. A portion of the distillate charged to manifold 36 may be discharged therefrom by way of a line 38 controlled by valve 40 leading in turn to a manifold 42 having a discharge reflux line 44 controlled by a valve 45 for the tower 26. The balance or all of the distillate from the manifold 36 is discharged by way of a line 46 leading to a manifold 48 having a discharge line 50 leading to a fractionation zone 52 which may suitably be a single atmospheric distillation column.

Within the zone 52, the fraction 50 is separated into an overhead propylene oxide distillate fraction 54 normally containing from about 0.1% to about 5% of water and minor quantities of impurities. Fraction 54 will normally contain from 0.1% to about 2.0% of impurities. Bottoms fraction 56 taken from column 52 will comprise the bulk of the water charged to column 52, substantially all of the propylene dichloride and most of the impurities initially present in the charge 50 for the column 52.

The overhead fraction 54 may be cooled in condenser 58 and then charged to a manifold 62 having a reflux line 64 controlled by a valve 60 for the column 52 and a charge line 66 for a purification zone 68. Purification zone 68 may suitably comprise a single distillation column which may either be an atmospheric column or a vacuum column. Within the zone 68 the feed fraction 66 is separated into a high-purity propylene oxide distillate fraction 70 containing more than 99% propylene oxide, only trace quantities of water and less than 50 parts per million of other impurities. This material is cooled in a condenser 72 and then charged to a manifold 76 having a discharge reflux line 78 controlled by a valve 74 for the column 68 and a product discharge line 80 leading to tankage or other suitable storage facilities for the high-purity product.

The bottoms fraction 82 from the column 68 will contain from about 10 to about 90 wt. percent of propylene oxide, the balance being water and propionaldehyde. Minor quantities of other impurities may also be present in the fraction 82. As a consequence, the fraction 82 does not have sufficient purity for many industrial applications and must either be utilized in an application wherein low purity is not a hindrance (e.g., propylene glycol production) or subjected to additional fractionation in order to obtain high-purity propylene oxide.

In accordance with the present invention, however, the fraction 82 is countercurrently contacted with water at a temperature within the range of about 100° to about 200° F. by way of a recycle operation whereby the propylene oxide in line 82 is ultimately recovered as high-purity propylene oxide and whereby the impurities in fraction 82 are discharged from the system either by the line 30 or the line 56.

As one example, the fraction 82 is charged to a manifold 84 and from then by way of a line 86 controlled by a valve 85 to a manifold 88 having a line 91 controlled by a valve 92 leading to a manifold 93 which, in turn, is provided with a discharge line 90 leading to distillation column 26 at a point below the middle of the tower whereby the propylene oxide from the line 82 will be countercurrently contacted within the desired temperature range with water charged by line 24 to tower 26 prior to its removal overhead by line 28 for recovery in the described manner.

As another alternate, the valve 92 may be closed and the fraction 82 may be charged by way of a line 94 controlled by a valve 96 leading to the manifold 42 for reflux line 44 for tower 26 to accomplish the desired high temperature countercurrent contacting. This operation is suitable provided that the propylene oxide concentration of the fraction 82 is more than about 75%.

As another alternative, and where the fraction 82 contains more than about 75 wt. percent of propylene oxide, valves 92 and 96 may be closed and the material may be routed from manifold 88 by way of a line 98 controlled by a valve 100 leading to the feed manifold 48 for the distillation column 52.

In a situation wherein all or a part of the fraction 82 is charged as reflux to the column 26, the amount of reflux obtained from manifold 36 may be correspondingly reduced.

In accordance with still another modification of the present invention, the valve 85 in the line 86 is closed and the fraction 82 is routed from manifold 84 by way of a line 102 controlled by a valve 104 to a washing zone 106 wherein the fraction 82 is countercurrently contacted with water charged to the zone 106 by way of a line 108. It will be understood that in this situation the countercurrent contacting operation will be conducted, in general, at a temperature within the range of about 100° to about 200° F. and more preferably within the range of about 100° to about 140° F. with from about 50 to about 95 vol. percent of water. The contacted propylene oxide from zone 106 is discharged by way of a line 110 leading to a manifold 112. From manifold 112 the fraction 110 may be charged by way of a line 114 controlled by a valve 116 to the reflux manifold 42 for tower 26. Alternately, the fraction 110 may be discharged from manifold 112 by way of a line 118 controlled by valve 120 leading to the charge manifold 48 for the fractionation tower 52.

In accordance with a still further embodiment of the present invention, the water for the washing zone 106 is derived from the bottoms fraction 56 of the fractionation zone 52.

In accordance with this embodiment, the bottoms 56 is charged to a manifold 122 having a purge line 124 controlled by valve 126 whereby a selected portion of the bottoms fraction 56 may be purged from the system. All or a part of the fraction 56 is discharged from manifold 122 by way of a line 128 controlled by a valve 130 leading to a separation zone 132 wherein the fraction 56 is split into a bottoms propylene dichloride fraction 134 and an overhead distillate water fraction 136 which is charged to a manifold 138 and from thence by line 108 to wash zone 106. All or a part of the fresh water for wash zone 106 may be charged thereto by way of a fresh water line 140 controlled by a valve 142.

The bottoms fraction 144 from the wash zone 106 which is composed of water and impurities is discharged by way of a line 152 controlled by a valve 154 to manifold 93 for recycle by way of line 90 to distillation column 26.

Having thus described my invention, what is claimed is:

1. In a method for the production of high-purity anhydrous propylene oxide from a reaction product comprising a major amount of water, a minor amount of propylene oxide and impurities comprising propylene dichloride and propionaldehyde, the improvement which comprises distilling said reaction product in a first distillation zone to obtain a partially de-watered first propylene oxide distillate fraction, distilling said first propylene oxide distillate fraction in a second intermediate distillation zone to provide a second distillation fraction composed principally of propylene oxide and containing about 0.1 to 5 wt. percent of water, separating said second distillate fraction in a third purification distillation zone into a high-purity anhydrous propylene oxide distillate product fraction and a bottoms propylene oxide fraction containing from about 10% to about 90% of propylene oxide, together with water and proprionaldehyde, countercurrently contacting said bottoms propylene oxide fraction with water of a temperature within the range of about 100° to about 200° F. to obtain a substantially propionaldehyde-free raffinate and recycling said raffinate to a distillation zone in advance of said purification zone.

2. A method as in claim 1 wherein said bottoms fraction is countercurrently contacted with water in a separate zone to provide a substantially propionaldehyde-free raffinate and said raffinate recycled to a distillation zone in advance of said purification zone.

3. In a method wherein chlorine is reacted with propylene in the presence of a large excess of water to provide propylene chlorohydrin and wherein the propylene chlorohydrin is contacted with an aqueous lime slurry to provide a treated product comprising in excess of about 90 wt. percent of water, not more than about 5 wt. percent of propylene oxide, the balance comprising calcium compounds, propylene dichloride, diisopropylene, propylene glycol and propionaldehyde, the improvement which comprises distilling said treated product in a first distillation column under distillation conditions to obtain a bottoms fraction comprising water, calcium compounds, propylene chloride and other impurities, and a first distillate fraction comprising from about 40% to about 90% propylene oxide, the remainder comprising mostly water, propionaldehyde and propylene dichloride, separating said first distillate fraction in a second intermediate distillation column under distillation conditions to provide a second bottoms fraction composed principally of water and containing substantially all of the impurities present in the said first distillate fraction, and a second distillate fraction containing 95% to 99.9% of propylene oxide, from about 0.1% to 5% of water, propionaldehyde and minor quantities of impurities, separating said second distillate fraction in a third purification distillation column into a third distillate anhydrous propylene oxide fraction containing more than 99% propylene oxide and less than 50 parts per million of impurities and a third bottoms fraction containing from about 10 to about 90 wt. percent of propylene oxide, together with water, propionaldehyde and other impurities, countercurrently contacting said third bottoms fraction with from about 50 to about 95 vol. percent of water at a temperature within the range of about 100° to about 200° F. to obtain a substantially propionaldehyde-free raffiinate and recycling at least a portion of said raffinate a distillation zone in advance of said third purification distillation zone.

4. A method as in claim 3 wherein said third bottoms fraction is countercurrently contacted with 50 to 95 vol. percent of water in a separate contact zone at a temperature of 100° to 200° F. to obtain said raffinate fraction and said raffinate fraction is recycled to said first distillation zone as reflux.

5. A method as in claim 3 wherein said second bottoms fraction is separated in a fourth distillation column into a fourth distillate water fraction and a fourth bottoms fraction, and wherein said fourth distillate water fraction and said third bottoms fraction are brought into countercurrent contact in a separate contact zone at a temperature of 100° to 200° F. to obtain a substantially propionaldehyde-free raffinate and wherein said raffinate is recycled to at least one of said first and intermediate column.

References Cited by the Examiner

UNITED STATES PATENTS

| | | | |
|---|---|---|---|
| 1,446,872 | 2/1923 | Brooks | 260—348.6 |
| 1,589,359 | 6/1926 | Burdick | 260—348.6 |
| 1,906,467 | 5/1933 | Heath | 23—154 |
| 2,434,322 | 1/1948 | Latchum et al. | 203—43 |
| 2,470,222 | 5/1949 | Patterson | 203—43 |
| 2,555,939 | 6/1951 | Sherwin | 203—75 |
| 2,615,901 | 10/1952 | McClellan | 260—348.6 |
| 2,622,060 | 12/1952 | Robeson et al. | 260—348 |
| 2,706,189 | 4/1955 | Pruitt et al. | 260—348 |

NOMAN YUDKOFF, *Primary Examiner.*

W. L. BASCOMB, JR., *Assistant Examiner.*